United States Patent Office 3,561,942
Patented Feb. 9, 1971

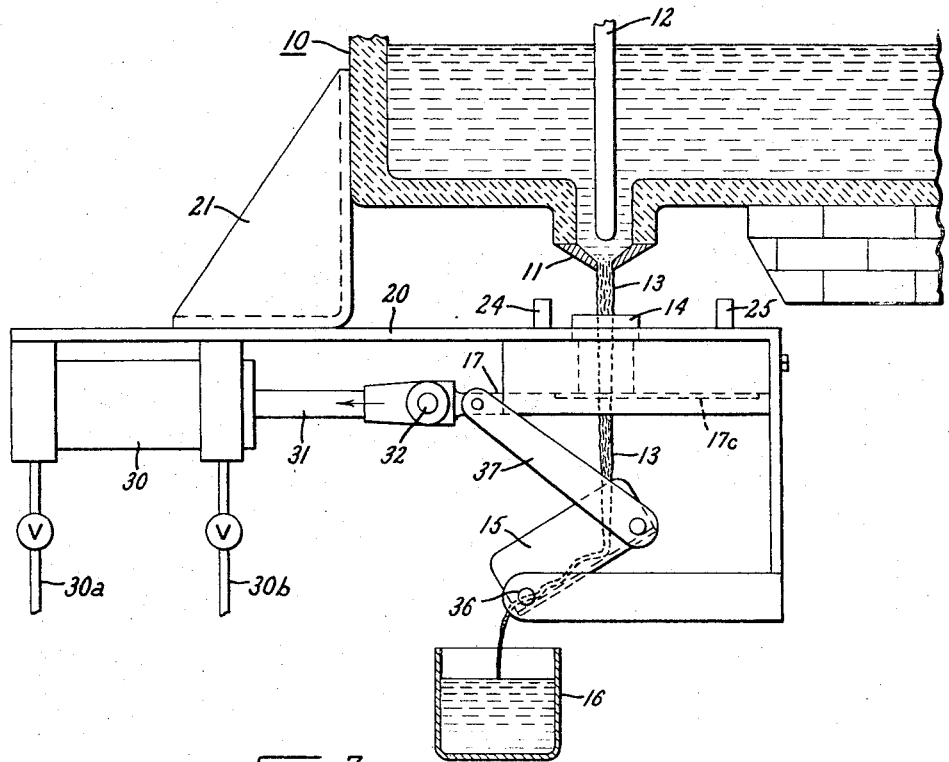
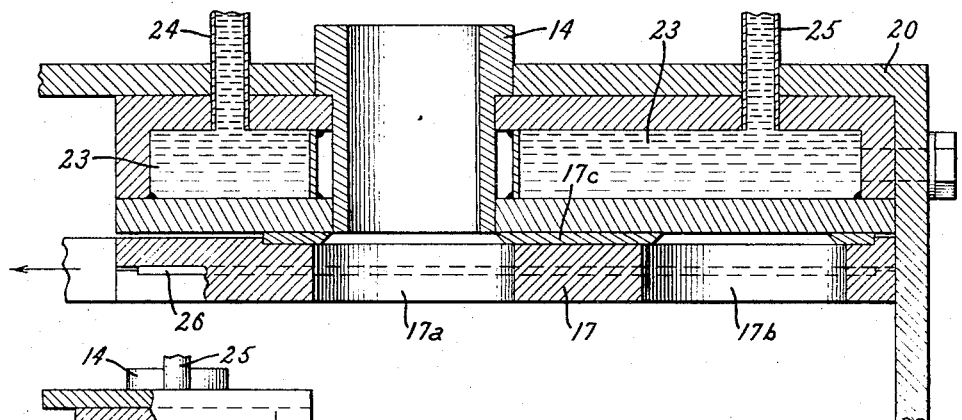
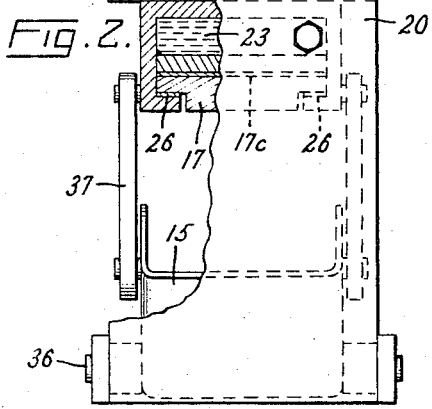
INVENTOR:
ROBERT B. CLEVERLY,
BY J. Wesley Hanbner
ATTORNEY

3,561,942
APPARATUS FOR FEEDING MOLTEN GLASS
Robert B. Cleverly, Pittsfield, Mass., assignor to General Electric Company, a corporation of New York
Filed Dec. 4, 1968, Ser. No. 781,127
Int. Cl. C03b 5/38
U.S. Cl. 65—325                4 Claims

ABSTRACT OF THE DISCLOSURE

This application discloses an improved flow control apparatus for a continuous discharge type glass furnace. The apparatus comprises a guide tube positioned to encircle a free-falling stream of discharged molten glass and a reciprocable shear plate movable across the open bottom end of the guide tube between two spaced-apart rest positions of non-interference with the glass stream. To this end the shear plate is provided with two spaced-apart apertures each of which is in registry with the guide tube in one rest position of the plate. An imperforate intermediate portion of the plate momentarily closes the bottom of the tube while the shear plate is in transit between its rest positions.

---

My invention relates to apparatus for feeding molten glass, and more particularly to improved shearing means for momentarily interrupting a free-falling stream of molten glass or the like, as in the casting or molding of discrete articles.

In discontinuous molding of glass articles, as by automatic or manually controlled machinery it is usual to provide a continuous flow of molten glass from the forehearth of a glass furnace and to control the stream of glass externally of the furnace to facilitate the changing of molds. Where a plurality of molds are automatically brought into molding position in a series of repetitive operations the glass stream is interrupted on the filling of one mold and released directly into the next consecutive mold. Similarly, where molds are brought into position at irregular intervals, as in manual operation, it is necessary to interrupt the glass stream upon the filling of one mold and to release it for discharge into a chute until the next molding operation is begun. In such case it is necessary to interrupt the flow to the chute momentarily while each mold is placed in position and to interrupt the flow into each mold while the chute is brought into position.

In all the foregoing interrupting operations it is desirable that the stream of glass be cleanly sheared with a definite motion and without splashing or throwing of the hot glass in a manner forming streamers or droplets. Such streamers or droplets are not only dangerous to an operator but they are also detrimental to the article being molded. If the chilled streams or drops of glass fall into the mold, they are likely to cause defects in the cast article.

Accordingly, it is a general object of my invention to provide improved apparatus for momentarily interrupting a stream of molten glass or the like without throwing out strings or drops of glass.

It is a more particular object of my invention to provide improved means for momentarily interrupting a free-falling stream of molten glass and temporarily storing the glass stream while changing a mold or other discharge receptacle.

In carrying out my invention in one preferred embodiment I provide beneath the discharge port of a glass furnace an open-ended tubular guide positioned to encircle a free-falling stream of molten glass flowing continuously from the discharge port. Beneath the guide tube I provide a discharge chute positioned to receive the glass stream and divert it to a cullet receptacle where it is cooled for return to the furnace. Immediately adjacent the lower open end of the guide tube I provide a reciprocable shear plate transversely slidable in a substantially horizontal plane between two rest positions to momentarily interrupt and store the molten glass in the stream while the chute is replaced by a mold or visa versa. To this end the shear plate is provided with two spaced-apart apertures each adapted for substantial registry with the end of the guide tube in one rest position of the shear plate. Between the apertures the shear plate provides an imperforate region sufficiently large to close the end of the guide tube while the plate is in transit between its two alternative rest positions.

My invention will be more fully understood and its objects and advantages further appreciated by referring now to the following detailed specification taken in conjunction with the accompanying drawing in which:

FIG. 1 is a fragmentary vertical cross-sectional view of the forehearth chamber of a typical glass-melting furnace, showing the discharge orifice and flow control apparatus embodying my invention.

FIG. 2 is an end view of the flow control apparatus shown at FIG. 1, and

FIG. 3 is a fragmentary cross-sectional view of the glass shearing and storing portion of the apparatus shown at FIGS. 1 and 2.

Referring now to the drawing, I have shown at FIG. 1 a fragmentary cross-sectional view of the forehearth chamber of a glass-melting furnace in which there is provided a discharge bowl or spout 10 having a conical orifice 11 in a lower wall thereof. Continuous flow of molten glass from the orifice 11 is controlled by a needle or rod 12 to provide a continuous stream of glass 13 falling freely by gravity beneath the orifice 11.

Beneath the discharge orifice 11 and spaced therefrom I provide means for controlling, and specifically for momentarily interrupting and storing, the glass stream 13 without disturbing its flow from the orifice 11. For this purpose I provide below the orifice an open-ended guide tube 14 concentrically positioned to surround the free-falling stream of glass 13 while permitting the glass to discharge normally into an inclined chute 15 disposed beneath the guide tube 14. It will be understood of course by those skilled in the art that glass discharging into the chute 15 is diverted into a suitable cullet receptacle 16 where it is cooled and returned to the furnace for reheating. Means are provided for moving the discharge chute 15 out of position and substituting therefor a glass mold and for momentarily interrupting the glass stream 13 during this operation. In order to so interrupt the stream of glass 13, I provide immediately adjacent the open lower end of the guide tube 14 a slidable shear plate 17 reciprocable between two alternative spaced-apart positions of rest in each of which the lower end of the guide tube 14 is open and between which the guide tube is momentarily closed by an imperforate portion of the shear plate. Preferably the movement of the shear plate 17 is mechanically linked with movement of the receiving chute 15 so that in one open position of the guide tube 14 the chute 15 is in receiving position and in the other open position of the guide tube 14 the chute 15 is displaced to permit another discharge receptacle such as a mold to be substituted therefor. Thus the chute is in transit only while the shear plate momentarily closes the tube 14 in moving from one rest position to the other.

The glass stream control mechanism described briefly above comprises a supporting frame 20 provided with a mounting bracket 21 for suitable affixation to the furnace in a position beneath and spaced from the discharge orifice 11. The tubular guide member 14 is mounted in the frame 20 and surrounded externally by an annular cooling jacket 23 through which water or other cooling fluid may be circulated. For this purpose the annular conduit 23 is provided with fluid inlet and outlet ports 24 and 25 adapted for connection to a source of cooling water or the like.

The shear plate 17 is slidably mounted in the supporting frame 20 on horizontal ways 26 (FIG. 2) and is provided with two spaced-apart apertures 17a and 17b each of which is of a size and configuration adapted for substantial registry with the open lower end of the guide tube 14. The shear plate 17 is reciprocally movable on the ways 26 across the open lower end of the guide tube 14 and between alternative rest positions in which one or the other of the apertures 17a, 17b is in coaxial registry with the lower end of the guide tube 14. For the purpose of cleanly cutting the glass stream as the shear plate is moved between its alternative rest positions there is set into the upper surface of the shear plate a cutting plate 17c (see FIG. 3) having spaced-apart apertures in substantial alignment with the apertures 17a, 17b and provided with conically tapered inner edges adapted to encounter the glass stream 13 at the upper surface of the shear plate. Between the apertures 17a and 17b the shear plate 17 provides an imperforate region sufficiently large to close the lower end of the guide tube 14 momentarily while the shear plate 17 is in transit between its alternative rest positions.

For the purpose of moving the slidable shear plate 17 back and forth between its two rest positions, I have shown by way of illustration a fluid motor 30 comprising a cylinder fixed to the supporting frame 20 and a movable piston connected to an actuating rod 31. The rod 31 is connected, as by a pin and slot linkage 32, to one end of the slidable shear plate 17. To control advance and retraction of the rod 31, the motor 30 is provided with fluid supply conduits 30a and 30b, respectively. In each conduit a control valve V is provided so that direction and speed of the motor 30 may be controlled. Control of motor speed provides control of the shear rate and of the amount of glass stored in the guide tube 14 during transit.

Beneath the shear plate 17 and supported in the frame 20 I have shown the discharge chute 15 pivotally mounted on a pin 36 for movement between operable and inoperable positions. In the operable position shown in the drawings, the chute is disposed in an inclined position beneath the free-falling glass stream 13 and the guide tube 14. In its inoperable position the inclined chute 15 is adapted to be rotated in a counterclockwise direction (as viewed in the drawings) to remove it from the path of the stream of molten glass. In order to move the chute 15 between these positions, I provide a pivoted link 37 connected at one end to the shear plate 17 and at the other end to the movable end of the chute 15. It will be understood by those skilled in the art that when the shear plate 17 is in the position shown in the drawings with its aperture 17a in registry with the guide tube 14 the discharge chute 15 will be in the intercepting or operable position shown, while when the shear plate 17 is in its alternative rest position with the aperture 17b aligned with the guide tube 14, the discharge chute 15 will be rotated counterclockwise to a non-intercepting position (not shown).

It will now be understood that in operation the continuous stream 13 of molten glass normally falls freely through the guide tube 14 into the deflecting chute 15 and thus into the cullet container 16. When it is desired to place a mold beneath the guide tube 14 the motor 30 is actuated to move the shear plate 17 to the left (as viewed in the drawing) to its alternative position in which the aperture 17b is in registry with the open lower end of the guide tube 14. In transit between these positions, the imperforate intermediate portion of the shear plate momentarily closes the bottom end of the guide tube 14 and stores molten glass falling from the orifice 11 in a continuous stream. When the orifice 17b comes into position, the stream is released for free passage through the guide tube 14 and reception in a suitable mold which has been placed in position during the transitory period of closure. During this shifting movement of the shear plate 17 the deflecting chute 15 has been moved counterclockwise to a non-intercepting position, as described above.

While I have illustrated and described only a preferred embodiment of my invention by way of illustration, other modifications will occur to those skilled in the art. For example, the shear plate 17 may be arranged for rotational rather than reciprocal planar movement, and may be provided with any desired number of registry apertures greater than one. I therefore wish to have it understood that I intend in the appended claims to cover all such modifications as fall within the true spirit and scope of my invention.

What I claim as new and desire to secure by Letters Patent of the United States is:

1. Apparatus for interrupting a free-falling stream of molten glass comprising an open-ended tubular guide member positioned to surround said stream in coaxial spaced relation, a shear plate mounted for planar movement transversely across the lower end of said guide member between alternative rest positions, said shear plate being provided with at least two spaced-apart apertures and an imperforate intermediate region and said apertures being alternately disposed in substantial registry with said lower end of said guide member in said rest positions, and actuating means for moving said shear plate between said rest positions, said shear plate when in transit between said rest positions interrupting said stream of molten glass and closing the lower end of said tubular guide member thereby to store said molten glass temporarily while shifting between said alternative rest positions.

2. An apparatus according to claim 1 wherein said shear plate is provided with a single pair of spaced-apart apertures and is slidably mounted for reciprocal movement between two alternative end positions of rest.

3. In an apparatus according to claim 1, a cooling jacket surrounding said tubular guide member, and means for circulating a cooling fluid through said jacket.

4. In combination with the apparatus of claim 1, a deflecting chute mounted beneath said apparatus for movement between intercepting and non-intercepting positions with respect to said stream, and actuating means coupled to said shear plate for moving said chute between said positions while said shear plate is in transit between its alternative rest positions.

References Cited

UNITED STATES PATENTS

| 1,323,450 | 12/1919 | Chamberlin | 65—221X |
| 1,375,336 | 4/1921 | Wadsworth | 65—332UX |
| 1,378,460 | 5/1921 | Hopkinson | 65—221 |
| 1,552,497 | 9/1925 | Noble | 65—122 |
| 2,106,545 | 1/1938 | Bates | 65—303 |

S. LEON BASHORE, Primary Examiner

R. L. LINDSAY, JR., Assistant Examiner

U.S. Cl. X.R.

65—123, 131, 332, 333